US012793953B2

(12) United States Patent
Shirvanyan et al.

(10) Patent No.: US 12,793,953 B2
(45) Date of Patent: Nov. 10, 2026

(54) FILTER STACK FOR A THOMSON PARABOLA SPECTROMETER

(71) Applicant: Marvel Fusion GmbH, Munich (DE)

(72) Inventors: Vahe Shirvanyan, Munich (DE); Marius Schollmeier, Munich (DE)

(73) Assignee: Marvel Fusion GmbH, Munich (DE)

( * ) Notice: Subject to any disclaimer, the term of this patent is extended or adjusted under 35 U.S.C. 154(b) by 638 days.

(21) Appl. No.: 17/941,554

(22) Filed: Sep. 9, 2022

(65) Prior Publication Data

US 2023/0077828 A1 Mar. 16, 2023

(30) Foreign Application Priority Data

Sep. 10, 2021 (EP) .................................... 21195978

(51) Int. Cl.
*H01J 49/06* (2006.01)

(52) U.S. Cl.
CPC .................................... *H01J 49/06* (2013.01)

(58) Field of Classification Search
None
See application file for complete search history.

(56) References Cited

U.S. PATENT DOCUMENTS

2017/0352519 A1* 12/2017 Rupp ...................... H01J 37/05
2018/0209925 A1* 7/2018 Antici ................ G01N 23/2257

OTHER PUBLICATIONS

Alejo et al., Characterisation of deuterium spectra from laser driven multi-species sources by employing differentially filtered image plate detectors in Thomson spectrometers, Review of Scientific Instruments 85, 093303 (2014) (Year: 2014).*

Alejo, A. et al., "Characterisation of deuterium spectra from laser driven multispecies sources by employing differentially filtered image plate detectors in Thomson spectrometers", Review of Scientific Instruments, American Institute of Physics, 2 Huntington Quadrangle, Melville, NY 11747, vol. 85, No. 9, Sep. 12, 2014, XP012189802, ISSN: 0034-6748, DOI: 10.1063/1.4893780, 7 pages.

Alejo, A. et al., "Recent developments in the Thomson Parabola Spectrometer diagnostic for laser driven multi species on sources", Journal of Instrumentation, vol. 11, No. 10, Oct. 13, 2016, 14 pages.

Extended European Search Report for Application No. EP21195978.8 dated Feb. 25, 2022, 8 pages.

Communication Pursuant to Article 94(3) EPC, dated Oct. 26, 2022, for European Application EP 21 195 978.8 (8 pages).

Hah et al., "Characterization of a High Repetition-Rate Laser-Driven Short-Pulsed Neutron Source," *Plasma Physics and Controlled Fusion*, vol. 60, No. 5, pp. 1-7, Mar. 22, 2018.

* cited by examiner

*Primary Examiner* — James Choi
(74) *Attorney, Agent, or Firm* — Seed Intellectual Property Law Group LLP

(57) ABSTRACT

A filter stack for a Thomson Parabola spectrometer, the filter stack having at least one filter foil of a filter material, wherein the filter foil is shaped to have stripes of a respective stripe size made of the filter material and gaps of a respective controlled gap size free of the filter material between the stripes or without gaps.

33 Claims, 11 Drawing Sheets

FILTER STACK FOR A THOMSON PARABOLA SPECTROMETER

BACKGROUND

Technical Field

The present disclosure relates to a filter stack for a Thomson Parabola spectrometer, a method of manufacturing a filter stack, and a Thomson parabola method for analyzing a beam of particles. The present disclosure can, for example, find an application in the development of fusion reactors as well as the development of applications using fusion science and high-energy plasmas in general.

Description of the Related Art

The interaction of high-intensity lasers with matter in many scenarios produces a highly ionized plasma with a mixture of different constituents, such as ions. Unambiguous measurement of the quantity and energy distribution, i.e., spectra, of the individual constituents of the plasma, i.e., ion species, is crucial for understanding the light-matter interaction. Diagnostics of high energy density plasma is a complicated subject and until now does not lend itself to a straightforward and unambiguous solution.

One of the most popular diagnostic instruments used in this context is the Thomson Parabola Spectrometer (TPS). Therein, a beam of particles is subject to a magnetic and an electric field, which separate different particles in the beam according to the charge-over-mass ratio, q/m, into different parabolic traces at the detector. From the resulting brightness of the parabolas, the spectra can be obtained.

While the TPS is a powerful tool in a scenario where the composition of the beam of particles is known, it suffers from the drawback that it resolves different ion species only by their charge-over-mass ratio. In mixed and highly ionized plasmas, however, the charge-over-mass discrimination is oftentimes insufficient, since different ion species can still have the same charge-over-mass ratio, for example 1/2: $^{10}B_{5+}$, $^{12}C_{6+}$, $^{14}N_{7+}$, $^{16}O_{8+}$, etc. In such a case, the different ions are guided by the fields along the same parabolic line, that is, their signals overlap on the detector and thus cannot be easily distinguished from each other, which prohibits analysis based on spatial position. However, the characterization of these overlapping ion species is crucial to understanding the underlying behavior of the plasma.

BRIEF SUMMARY

According to an embodiment of the present disclosure, there is provided a filter stack for a Thomson Parabola spectrometer, the filter stack having at least one filter foil of a filter material, wherein the filter foil is shaped to have stripes of a respective stripe size made of the filter material and gaps of a respective controlled gap size free of the filter material between the stripes or without gaps.

According to a further embodiment of the present disclosure, there is provided a method of manufacturing a filter stack for a Thomson Parabola spectrometer, the method comprising the step of cutting a filter foil, so that the filter foil is shaped to have stripes of a respective stripe size made of the filter material and gaps of a respective controlled gap size free of the filter material between the stripes or without gaps.

According to a further embodiment of the present disclosure, there is provided a Thomson parabola method for analyzing a beam of particles, the beam comprising two or multiple types of charged particles with equal charge-over-mass ratio, using a Thomson Parabola spectrometer, the method comprising the steps of: filtering the beam of particles using a filter stack, preferably according to one of the embodiments of the present disclosure, and analyzing the beam of particles using a detector plate.

BRIEF DESCRIPTION OF THE DRAWINGS

Embodiments of the present disclosure, which are presented for better understanding the disclosed concepts, but which are not to be seen as limiting the claims, will now be described with reference to the figures in which:

DETAILED DESCRIPTION

Figure 1B:
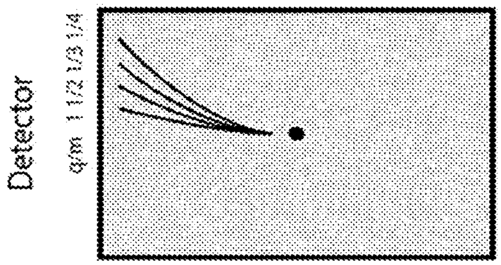
FIGS. 1A and 1B show a schematic overview of a Thomson Parabola spectrometer and a filter stack according to an embodiment of the present disclosure used therein, as well as a schematic result of a measurement on a detector plate.
Figure 1A:
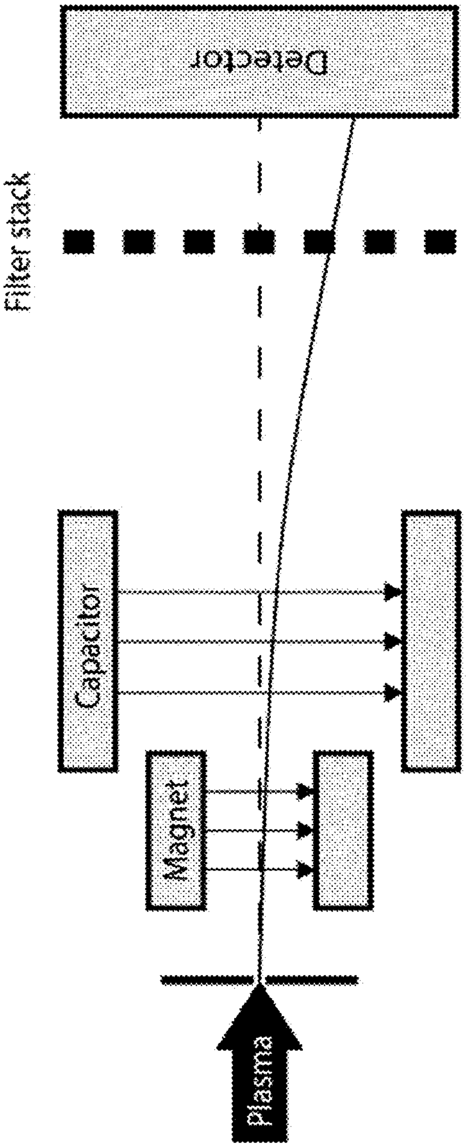

FIGS. 1A and 1B show a schematic overview of a Thomson Parabola spectrometer and a filter stack 1 according to an embodiment of the present disclosure used therein, as well as a schematic result of a measurement on a detector plate.

In particular, FIGS. 1A and 1B demonstrate the schematics of a Thomson Parabola spectrometer, as well as the schematics of an example measurement. A pinhole at the entrance of the instrument selects a bundled beam of particles from the expanding plasma. This beam then passes through a magnetic and an electric field, before arriving at a detector plate. Typically, the magnetic field and the electric field are kept constant and uniform such that the deflecting forces acting on the particles are the same for the entire beam of particles. The uncharged particles are not affected by the fields, propagate straight through, and thus appear as a dot on the detector (bottom left corner in FIG. 1B). Different from that, the charged particles are deflected by the fields due to the Lorentz force deflecting the particles in parabolic lines depending on their properties (charge, mass and energy). Analyzing the brightness along the parabolas allows to extract the aforementioned spectra. As discussed elsewhere in this document, a conventional TPS, that is, a TPS without a filter stack 1 according to an embodiment of the present disclosure resolves different particles only by their charge-over-mass ratio, conventionally expressed as q/m. In a case where the composition of the beam of particles is known or a scenario in which the occurrence of two (or more) types of particles with the same charge-over-mass ratio can be excluded, this is a powerful tool. If this is not the case, different particles overlap on the same parabolic line and accordingly the analysis is hindered.

A filter stack 1 according to embodiments of the present disclosure resolves this complication by allowing to filter the different particles with same charge-over-mass ratio such that the ambiguity can be resolved, thus allowing a TPS to be used also in such scenarios to provide reliable and detailed information about the different types of particles, for example, about the spectra. In other words, the filter stack 1 allows to resolve the "blindness" of the instrument to different ions with same charge-over-mass ratio. In very general terms, this is achieved since different particles with the same charge-over-mass ratio have different masses and accordingly are stopped by matter, i.e., the filter, differently. Therefore, the filter stack 1 can stop certain particle types while not stopping the other particle types, thereby differentiating between the particles. Furthermore, more than one filter stack 1 may be used in combination to extend this concept to more than two types of particles with the same charge-over-mass ratio. Such a scenario could be achieved by having a first filter stack 1 configured to transmit the two lightest ion species from the plasma mixture and a second filter stack 1 after the first stack, for example right behind it, that filter only the lightest ion species. In this way, three different curves could be measured and interpolated individually.

Figure 2:
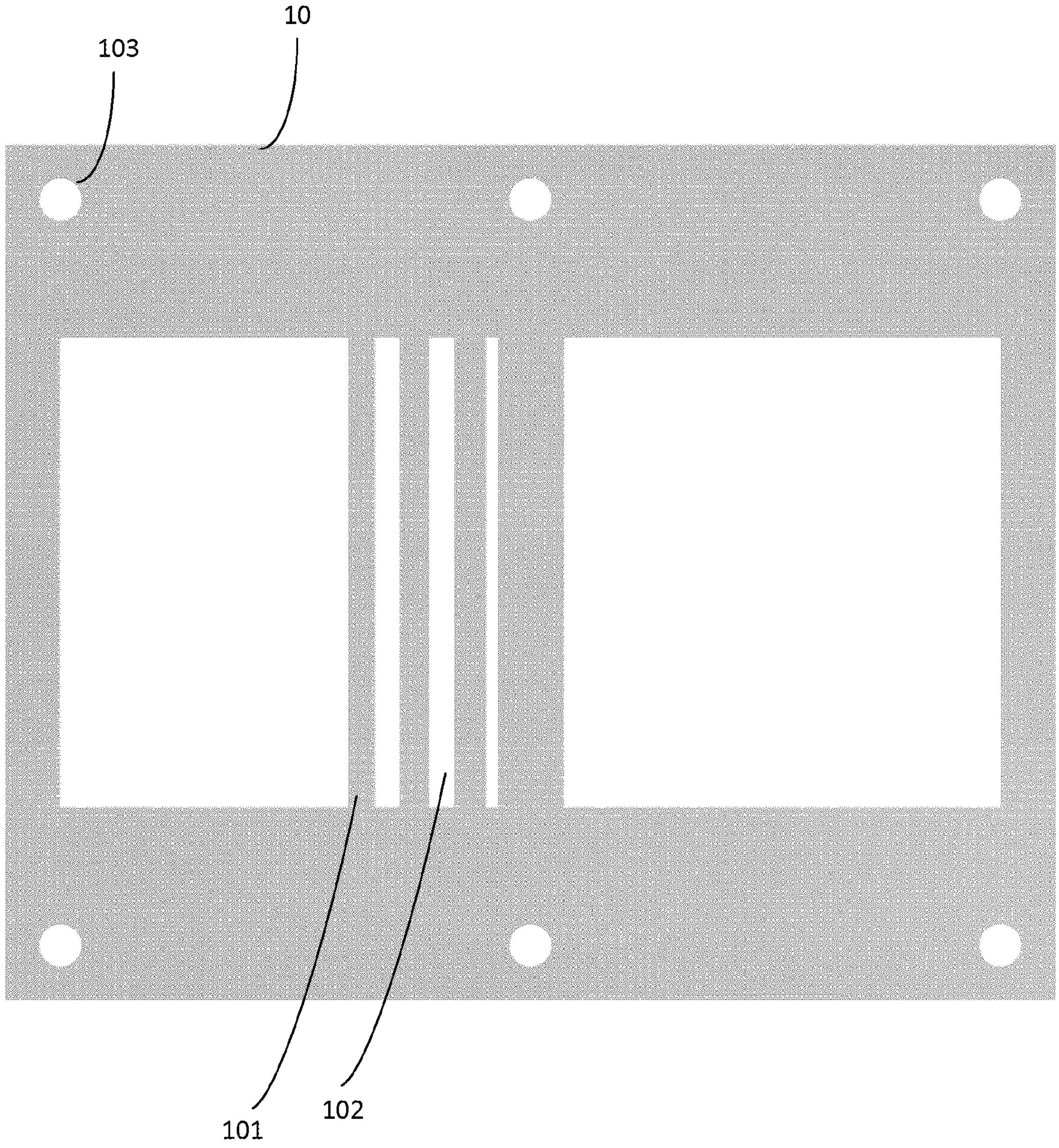
FIG. 2 shows a schematic filter foil of the filter stack according to an embodiment of the present disclosure.

FIG. 2 shows a schematic example of a filter foil 10 of the filter stack 1 according to an embodiment of the present disclosure. In this example, the filter foil 10 has stripes 101 of a filter material and gaps 102 between the stripes 101. In other words, the filter foil 10 has alternating stripes. The stripes 101 and gaps 102 are enclosed by the filter material providing the filter foil 10 as a whole. As depicted, the filter foil 10 may have guiding holes 103 at the end for placing and fixating the filter foil 10 as a part of the filter stack 1 and/or filter stack 1 as a whole.

That is, the filter stack 1 for a Thomson Parabola spectrometer may have at least one filter foil 10 of a filter material, wherein the filter foil 10 is shaped to have stripes 101 of a respective stripe size made of the filter material and gaps 102 of a respective controlled gap size free of the filter material between the stripes 101 or without gaps.

The sizes of the stripes 101 and the gaps 102 may be controlled in view of the goal to separate two types of particles with same charge-over-mass ratio as discussed elsewhere in this document.

In line with FIG. 2, in a filter stack 1 according to the present disclosure, the stripes 101 are parallel. Alternative embodiments of the present disclosure may cover stripes 101 that are, for example, trapezoidal, curved, or have a different shape. Accordingly, the stripes 101 can have a constant width or varying width along their main extension direction. The shape has an influence of the filtering done. Referring to FIG. 1B, the choice of type of stripes 101, for example, parallel or curved and having a constant width or a varying width, has an influence according to which parameters the filtering is performed. For example, apart from parallel stripes 101, stripes 101 coming out from the focal point of the parabola and following, perpendicular to it, its curvature, or shapes following a line of equal energy or equal velocity or equal momentum between different charge states may prove to be useful for specific experiments. For instance, stripes 101 crossing the parabola perpendicularly, instead of, for example, vertically, may result in an improved energy resolution of the TPS. Furthermore, more complex curved shapes 101 may allow achieving a desired filtering for multiple parabolas simultaneously, whereby each corresponds to a mixture of particles with different charge-over-mass ratios.

As described above, the filter stack 1 according to an embodiment of the present disclosure may contain gaps 102 that are enclosed on at least three sides, preferably enclosed on all sides, by the filter material. More preferably, the gaps 102 are rectangularly shaped.

Regarding the manufacturing, the gaps 102 of a filter stack 1 according to an embodiment of the present disclosure are cut into the filter foil 10 for it to be shaped to have the stripes 101 and gaps 102. In particular, the use of a thermoset polymer as a foil material allows to use laser cutting. This allows for an easy and variable but also very precise production of the individual filter foils 10 and in consequence the filter stack 1 as a whole.

Moreover, the manufacturing method allows to position alignment holes 104 which can be used to precisely position the assembled filter stack 1 relative to the TPS, in particular using an alignment laser beam.

Moreover, the manufacturing method allows to make a conventional differential filter, i.e., with a stair-step thickness profile and with no gaps.

Moreover, the filter foil 10 may be made of a HV-compatible material, in particular of a polymer. Here, HV refers to high voltage; that is, the filter foil may be made of a high voltage compatible material. This may be particularly advantageous in scenarios of high voltages when compared to conventional filter using metals. Polymers are HV-compatible since they show little-to-no interaction with high voltages and thus are not affected by high voltages. An example for such a polymer is polyimide. A further advantage of using a polymer as filter material is that it can easily be used in laser-cutting, thus allowing for high precision manufacturing. High precision manufacturing may be particularly advantageous in small TPS instruments.

Furthermore and in line with the above, the present disclosure also provides a Thomson parabola method for analyzing a beam of particles, the beam comprising two types of charged particles with equal charge-over-mass ratio, using a Thomson Parabola spectrometer. The method comprises the steps of filtering the beam of particles using a filter stack 1 according to an embodiment of the present disclosure, and analyzing the beam of particles using a detector plate. As discussed above, the filter stack 1 can be used to resolve the "blindness" beyond charge-over-mass ratio and thus provide, for example, more resolved spectra.

Figure 3:
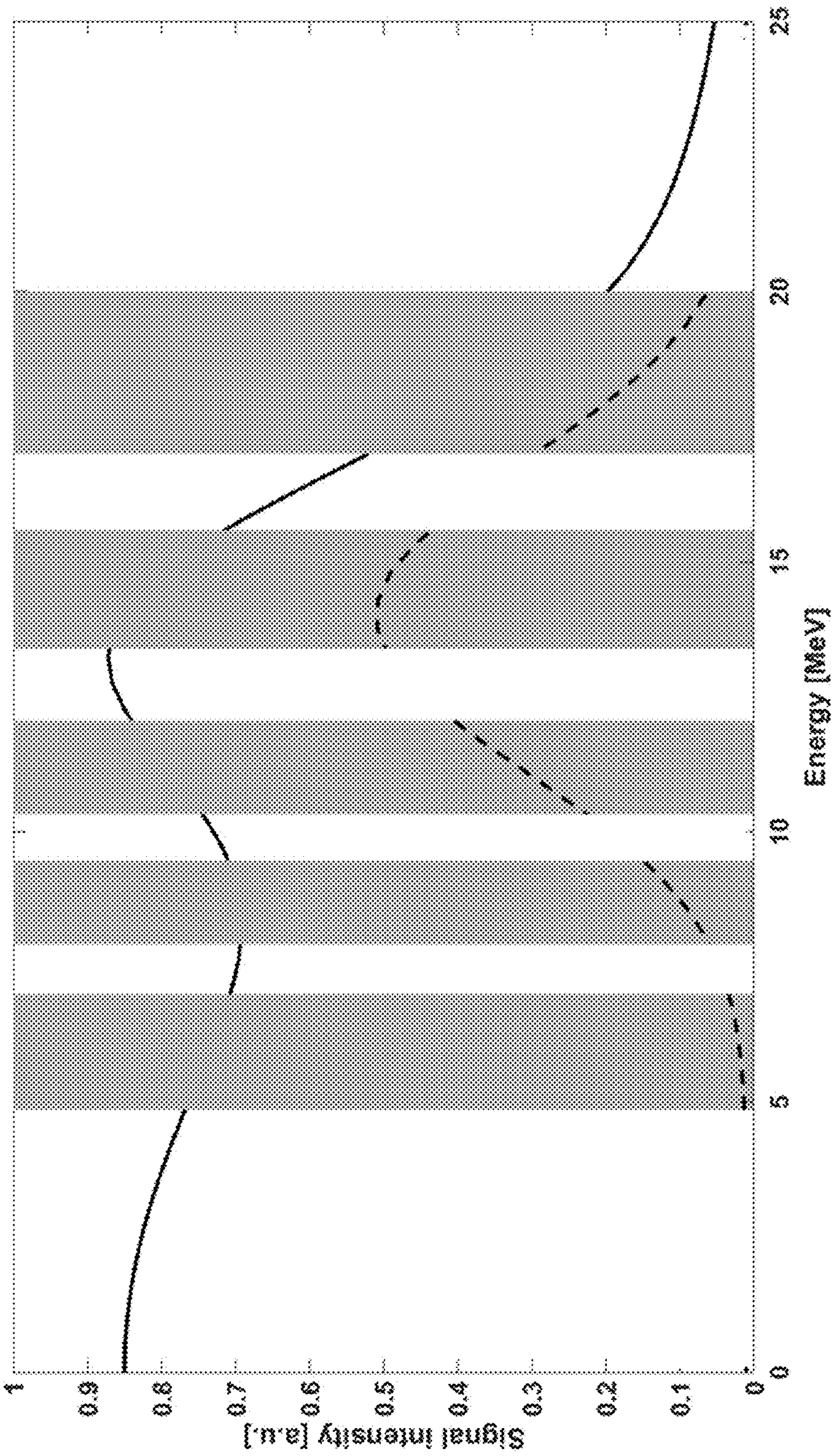
FIG. 3 shows a schematic spectrum recovered from a filter stack according to an embodiment of the present disclosure.

FIG. 3 shows a schematic spectrum recovered from a filter stack 1 according to an embodiment of the present disclosure.

FIG. 3 shows a spectrum, that is the signal intensity (here in arbitrary units) as a function of the energy (here in units of MeV). The grey stripes indicate the parts in which the filter stack 1 according to the present disclosure has stripes 101 while the remaining parts (the white parts) indicate the parts with gaps 102 (that is, without filtering). The measured data for the unfiltered parts is represented by a solid line while a dashed line shows the measured data for the filtered parts. Clearly, the intensity of the filtered data is lower than the intensity of the unfiltered data as the unfiltered data includes the filtered data. Moreover, due to the positions and the sizes of the stripes 101, it is evident that the curves of the filtered and unfiltered data can easily be interpolated over the whole energy range, thus leading to a complete spectrum of the unfiltered and the filtered data, i.e., a reconstruction of the missing data. This is in particular due to the slow change of the spectrum as a function of the energy.

In line with the above, the stripe sizes and the gap sizes of the filter foil 10 of a filter stack 1 according to an embodiment of the present disclosure are configured to result in selectively filtering and not filtering at least one type of particle of a potential beam of particles with equal charge-over-mass ratio to be analyzed.

In the case that the beam of particles also contains neutral particles that are not deflected by the magnetic field or the electric field of the TPS, these neutral particles are also part of the measured data. In some scenarios, this may lead to a very bright spot on the detector plane which might influence the quality of the measurement results. Accordingly, if this data is not of particular interest, it may be appropriate to filter it out. Accordingly, in an embodiment of the present disclosure, the filter thickness in certain regions of the filter stack 1 is changed to adjust the attenuation of the particle beam, preferably in the regions of the filter stack 1 filtering neutral particles. In other words, by providing a filter foil 10 with high thickness where the neutral particles are expected, the flux of these neutral particles may be adjusted before reaching the detector plate. Moreover, this may also filter out X-ray radiation, which may be a relevant background radiation as well.

FIGS. 4A, 4B, 4C, and 4D show a schematic overview of considerations involved in determining the parameters of the filter stack 1 according to an embodiment of the present disclosure.

Figure 4A:
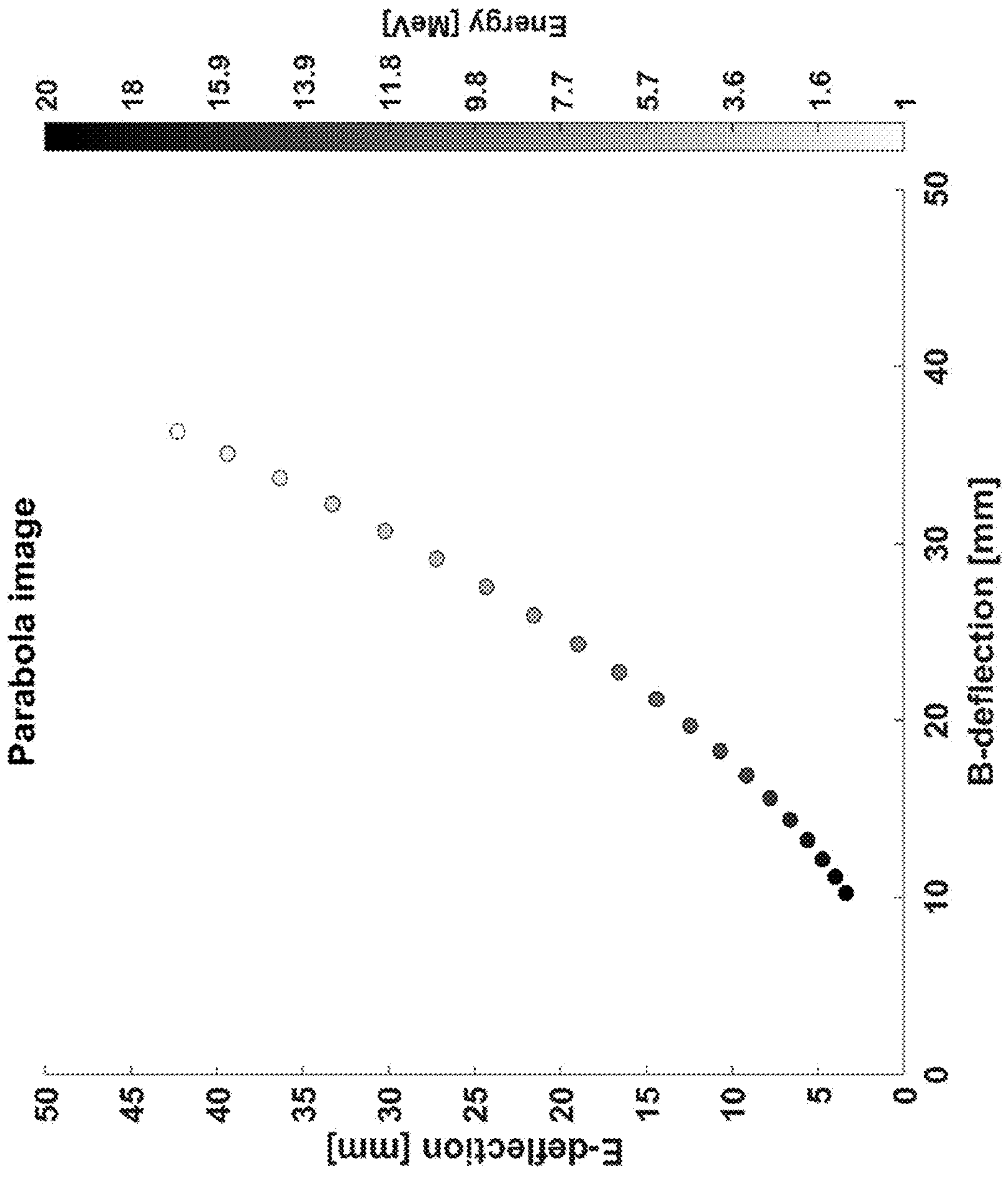
FIGS. 4A, 4B, 4C, and 4D show a schematic overview of considerations involved in determining the parameters of the filter stack according to an embodiment of the present disclosure.

More specifically, FIG. 4A shows an image of a parabola on the detector for an incoming particle with charge-over-mass ratio of 1/2, more specifically an alpha particle. The x-axis shows the deflection due to the magnetic field (here abbreviated as 'B-deflection') in units of millimeter on the detector. The y-axis shows the deflection due to the electric field (here abbreviated as 'E-deflection') in units of millimeter on the detector. The grey scale decodes the incoming energy in units of MeV, wherein particles with higher energy are darker: the fast particles pierce through the electric field and the magnetic field with very little deflection, while the slower ones are subject to the field for a longer time and thus drift away further from the particle beam axis.

Figure 4B:
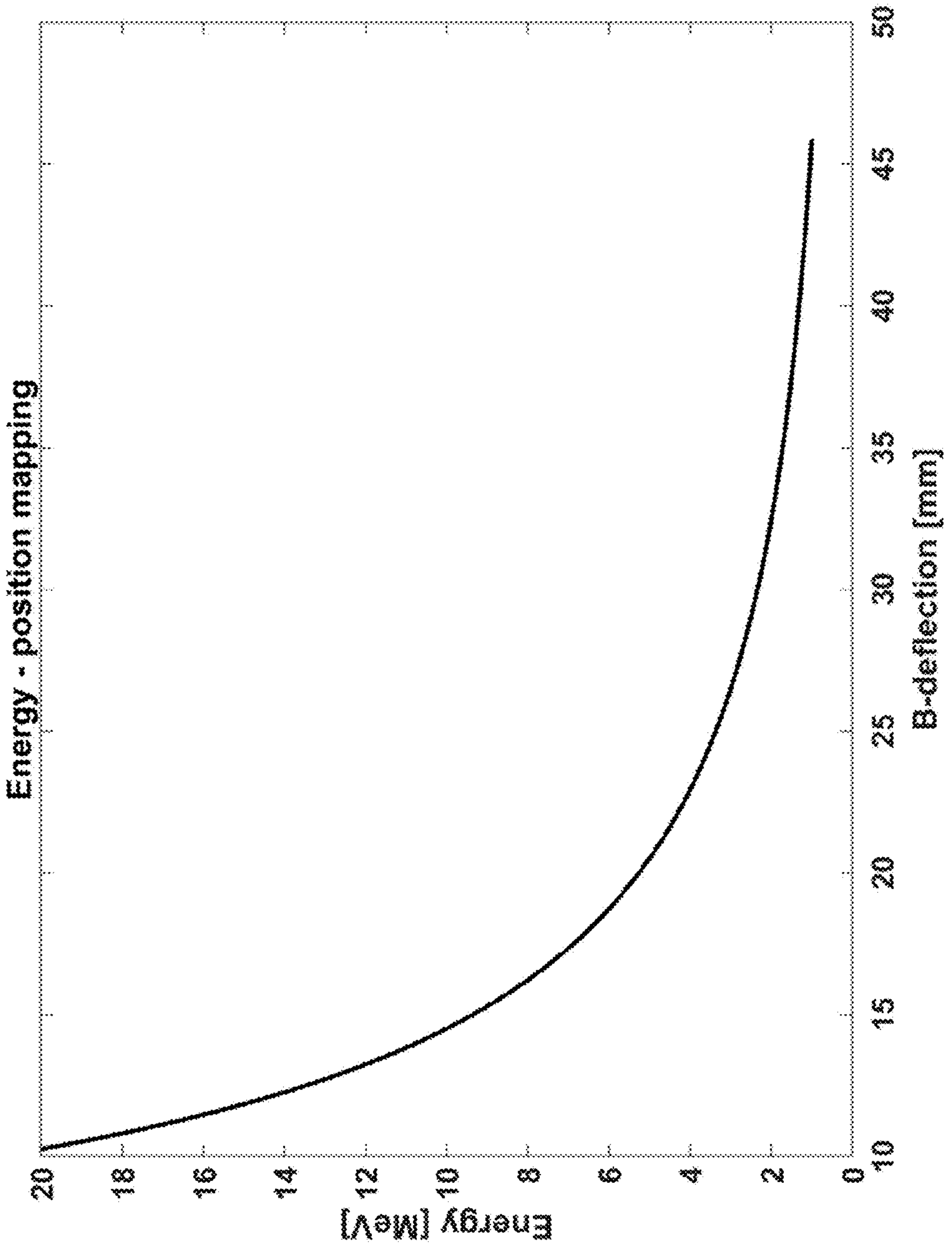

Furthermore, FIG. 4B shows the mapping of the energy in units of MeV to the deflection due to the magnetic field in units of millimeter, i.e., the dispersion (or energy-position dispersion) of the instrument, i.e., the TPS. This curve depends both on general physics laws such as the Lorentz force but also on the specific parameters of the TPS.

Figure 4C:
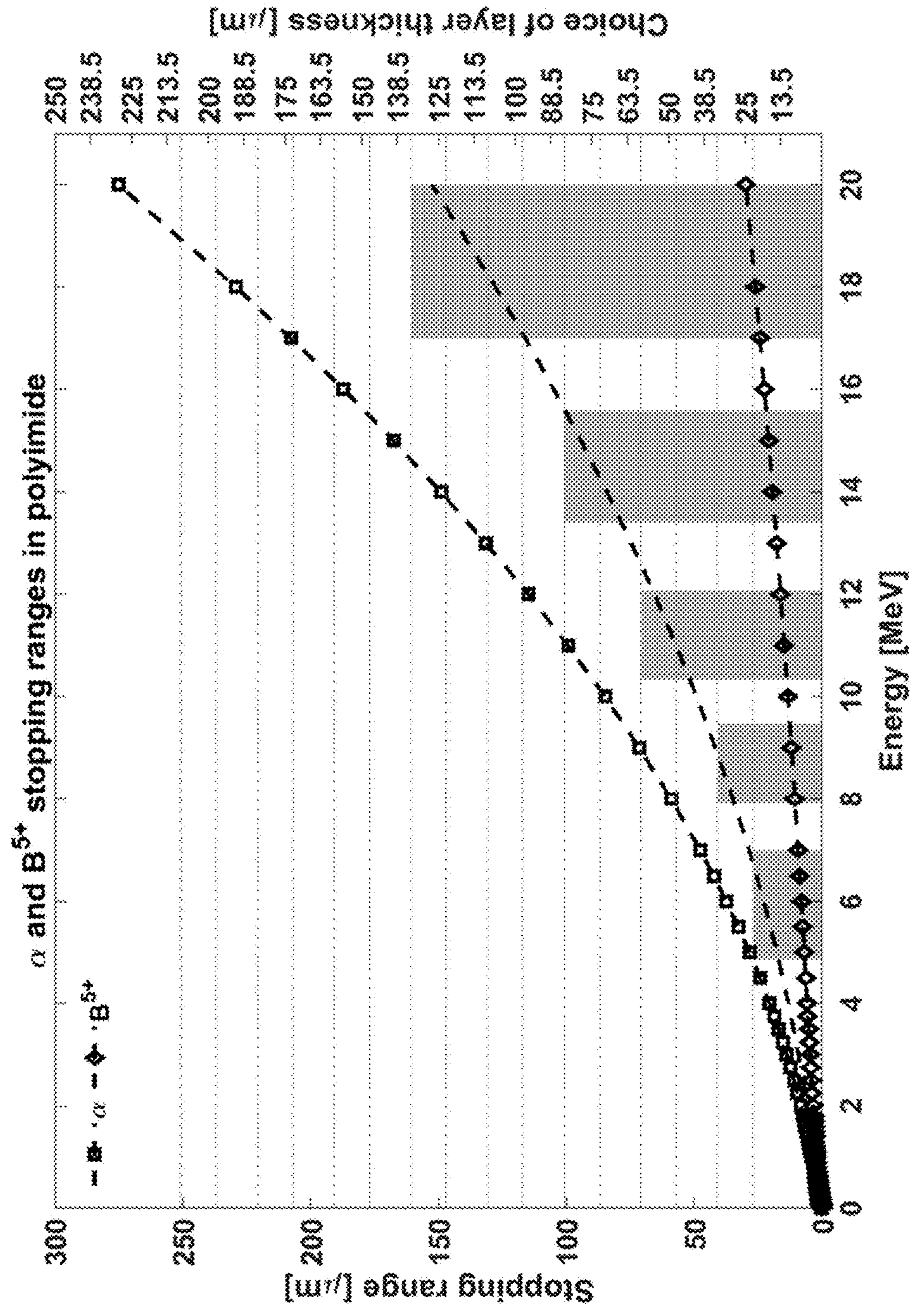

Next, FIG. 4C shows a sample calculation of the stopping ranges and a possible filter stack configuration in energy space. The vertical scale on the left represents the stopping range in units of micrometer, in this case for boron ions (diamond) and alpha particles (squares). The grey bars represent the position, width, and thickness of the filter stripes 101. In this example, this is chosen in increments of commercially available foils. This is also indicated by the vertical scale on the right representing layer thickness in units of micrometer. This is further indicated by the dashed line aligning with the grey bars between the alpha particle line and the boron ions line. As can be seen from the image, the thickness and position and size of the filter stack 1 is determined such that it separates alpha particles from boron ions: While the thickness of each stripe 101 is bigger than the stopping range of the boron ions, it is lower than the stopping range of the alpha particles, leading to a separation of the two types of particles over the whole energy range.

Figure 4D:
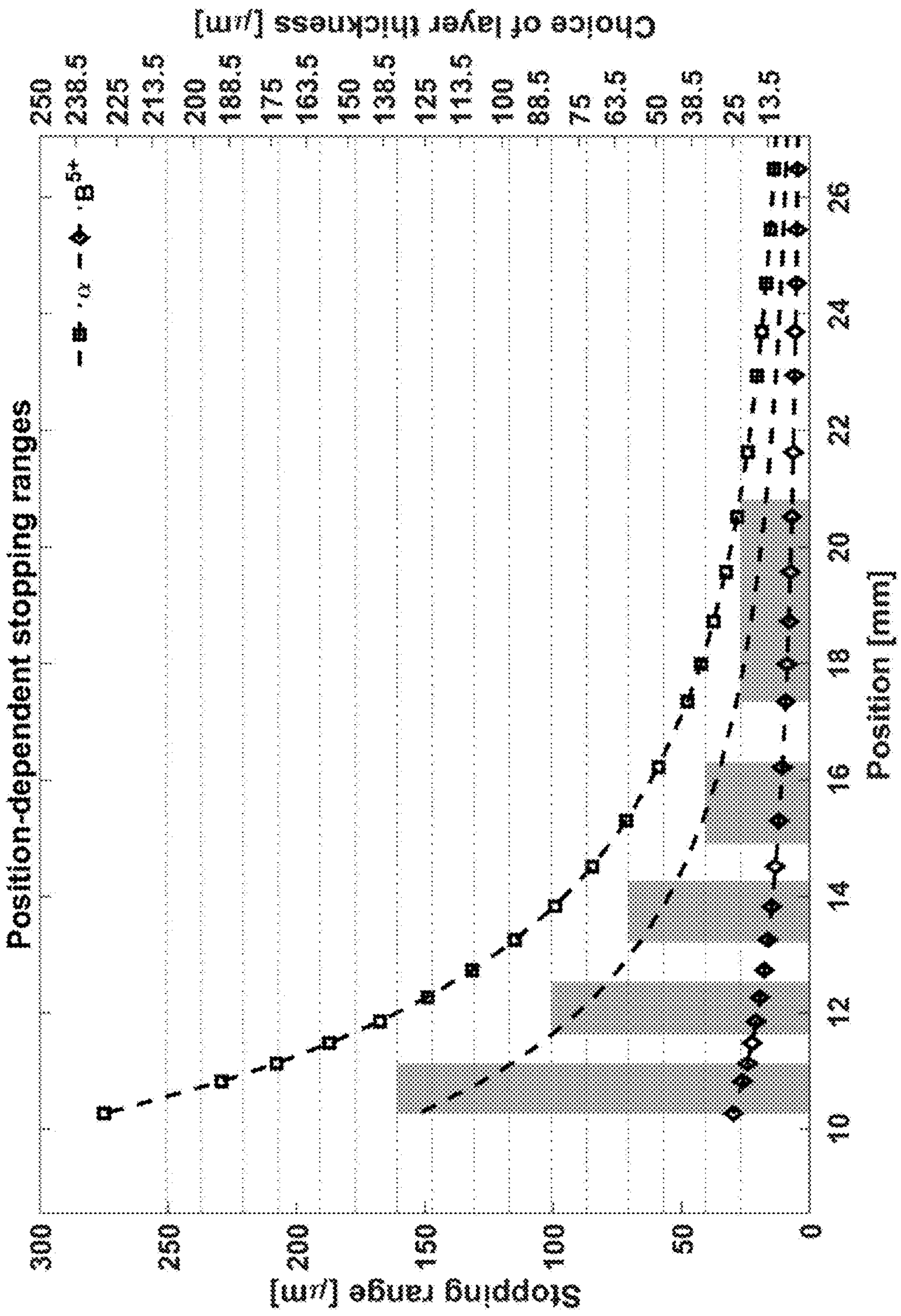

This configuration shown in FIG. 4C has to be transferred from energy space into position to manufacture the filter stack. The corresponding calculation and configuration are shown in FIG. 4D. This image shows the same situation as the bottom left image with the difference that the x-axis represents the position in units of millimeter. Accordingly, the grey bars indicate the position and size of the stripes, their heights indicating the thickness. It is noted that the more equidistant and balanced distribution of the stripes from the energy space stretches and shrinks while mapped into real space, according to the dispersion of the instrument shown in FIG. 4B. This can be understood as a consequence of the non-linear dispersion of the instrument.

From this, it can be understood that in an embodiment of the present disclosure the method of analyzing the beam further comprises determining the shapes, sizes and positions of the stripes 101 and the shapes, sizes and positions of the gaps 102 based on at least one of two types of charged particles with equal charge-over-mass ratio to be analyzed by the Thomson Parabola spectrometer, stopping ranges of the elements, and parameters of the Thomson Parabola spectrometer.

Moreover, according to a further embodiment of the present disclosure in the method of analyzing the beam the stripe sizes and the positions of the stripes 101 and the gap sizes and the positions of the gaps 102 may be determined such that, according to the stopping ranges of the two types of charged particles with equal charge-over-mass ratio to be measured and the parameters of the Thomson Parabola spectrometer, the filter stack 1 used with the Thomson Parabola spectrometer filters at least one of the elements to be measured.

In addition, in a further embodiment of the present disclosure, the determination of the stripe sizes and positions of the stripes 101 and the determination of the gap sizes and positions of the gaps 102 may further include considering a distribution of the stripes 101 and gaps 102 to be balanced regarding filtering and non-filtering parts of the filter based on the energy-position dispersion of the Thomson Parabola spectrometer.

It is clear that this procedure described in the context of the above FIGS. 4A to 4D can be implemented by means of software, i.e., a computer program. Such a computer program may receive as an input the parameters of the TPS as well as the (expected) particle types in the beam of particles, in particular those having the same charge-over-mass ratio. Further, an input may be which of these particles should be filtered and which aspects of the different quantities are of specific interest. Then, based on stopping range calculations for the particles types of interest, a stripes-and-gaps configuration in terms of width, position and thickness may be determined (calculated) and provided as output. This output may be then directed to a manufacturing process.

Furthermore, the program may also include a step of optimization of the configuration of the stripes 101 and gaps 102 such that the information gained by using the filter stack 1 is a balance between filtered and non-filtered information allowing faithful reconstruction of the entire information. This step may be supported by data provided from experiments done without a filter, i.e., supported by data about the typical unfiltered spectrum.

Figure 5:
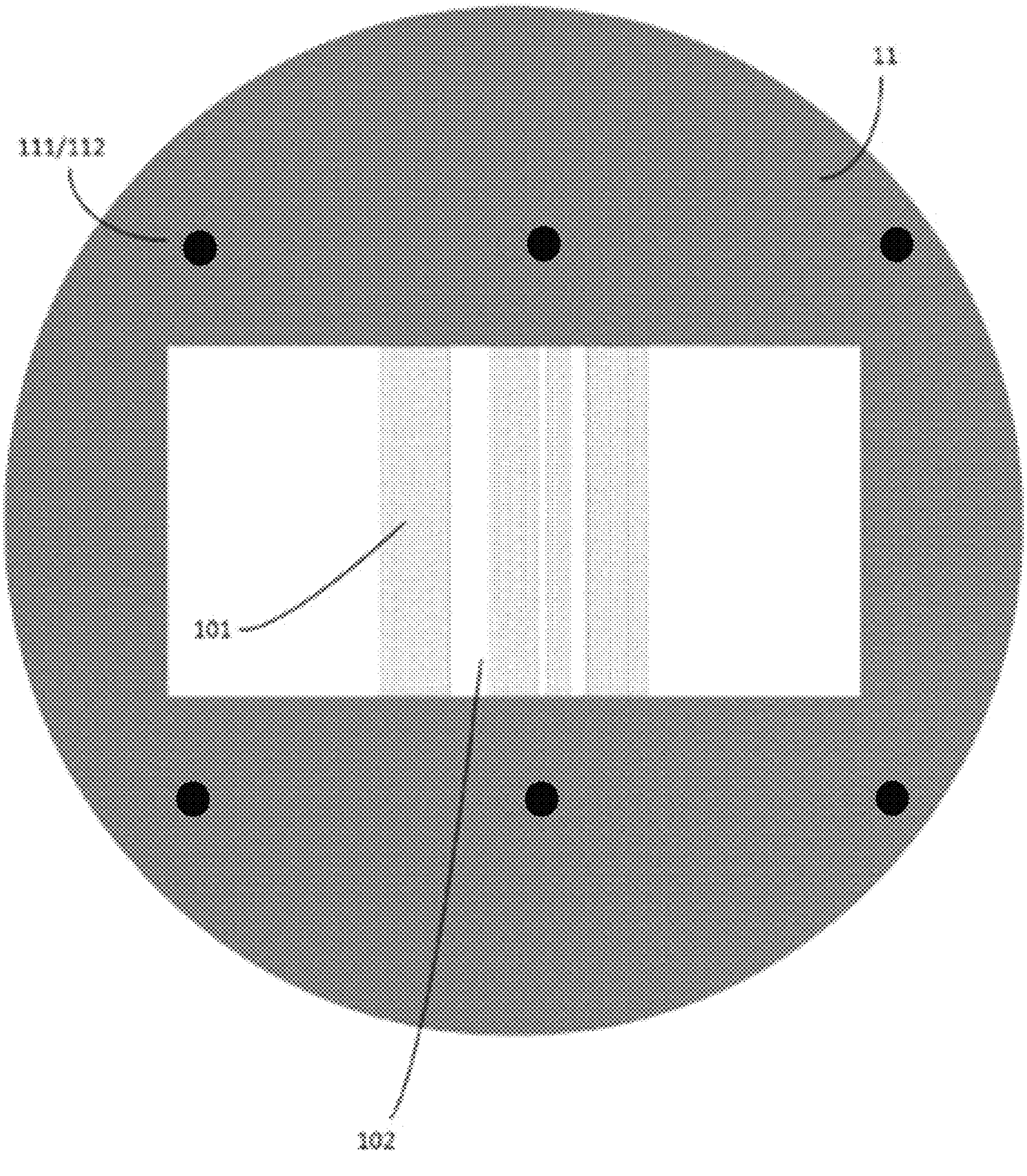
FIG. 5 shows a schematic view of a front view of an assembled filter stack according to an embodiment of the present disclosure.

FIG. 5 shows a schematic view of a front view of an assembled filter stack 1 according to an embodiment of the present disclosure.

Figure 6:
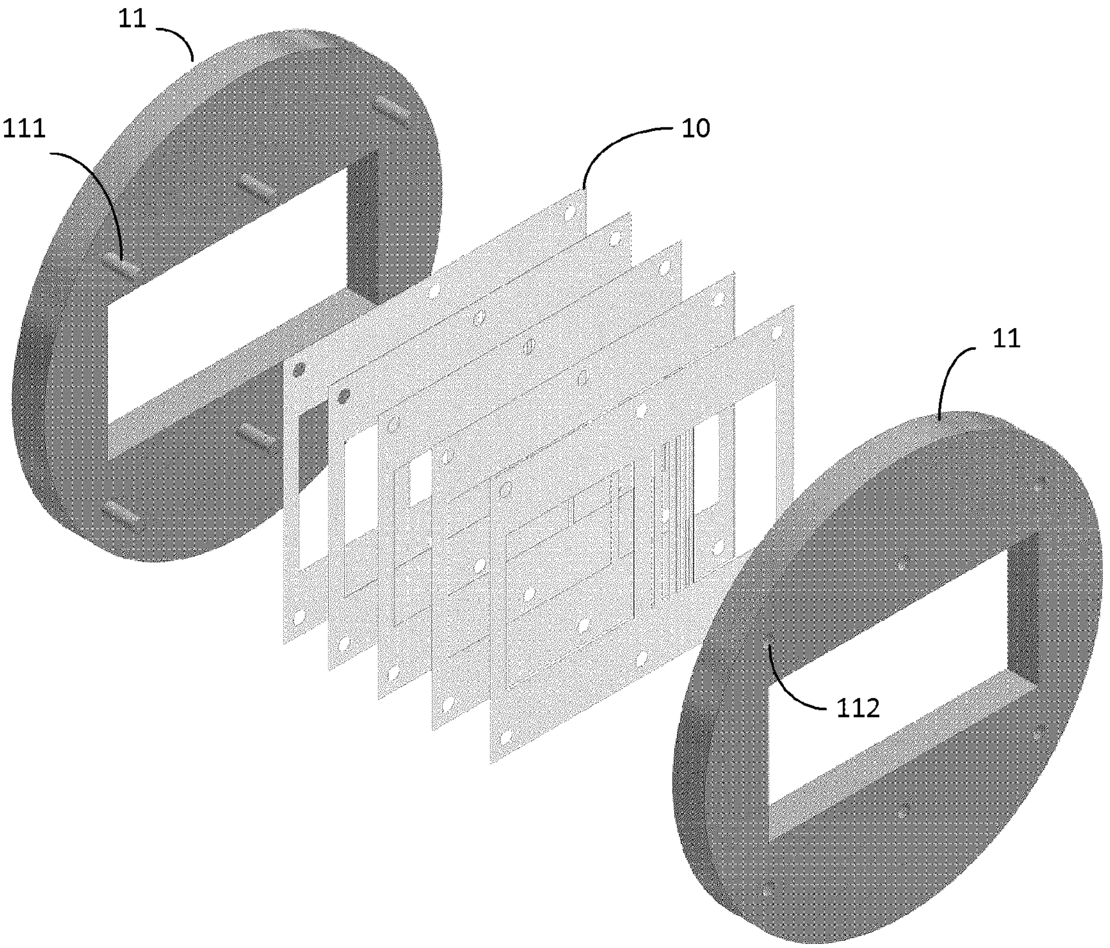
FIG. 6 shows a schematic explosion view of a plurality of filter foils within a filter stack and the support frame according to an embodiment of the present disclosure.

FIG. 5 shows the assembled filter stack 1 including a round frame 11 (support frame 11) with six guiding openings 112 (one top left, top center, top right, bottom left, bottom center and bottom right each, see FIG. 6) as well as the filter foils 10 in the center of the of the assembled filter stack 1. The different grey scales indicate the different thickness of the resulting stripes 101. The guiding openings 112 may both facilitate the manufacturing as it allows several filter foils to be arranged together in a precise manner using guiding pins 111, but may also allow the filter stack to be fixated precisely in the overall measurement setup of the TPS.

Accordingly, in a filter stack 1 according to the present disclosure, the filter stack 1 further comprises a frame 11, the frame preferably comprising at least one guiding pin 111, and the filter foil 10, preferably a plurality of the filter foils 10, is configured to be assembled onto the frame 11, in particular in that each of the filter foils 10 comprises at least one guiding opening 112 for receiving the at least one guiding pin 111.

FIG. 6 shows a schematic explosion view of a plurality of filter foils 10 and the support frame 11 according to an embodiment of the present disclosure. In detail, FIG. 6 shows, from left to right, a back of the round frame 11 with six guiding pins 111 and a rectangular opening, a plurality of filter foils 10, each with different stripes 101 and gaps 102 and a front of the round frame 11 with six guiding openings 112 corresponding to the six guiding pins 111. The stacking of filter foils 10 allows for a flexible manufacture of the filter stack 1 as each filter foil 10 may have the same thickness and the resulting profile of varying thickness over the width of the filter stack 1 can thus be obtained by the different filter foils 10 with different stripes 101 and gaps 102.

Accordingly, the present disclosure also comprises a method of manufacturing a filter stack 1 for a Thomson Parabola spectrometer, in particular according to any of the filter stacks 1 discussed elsewhere in this document, the method comprising the step of cutting a filter foil 10, so that the filter foil 10 is shaped to have stripes 101 of a respective stripe size made of the filter material and gaps 102 of a respective controlled gap size free of the filter material between the stripes. Moreover, the cutting of the filter foil 10 may be a laser-cutting of the filter foil 10.

Figure 7:
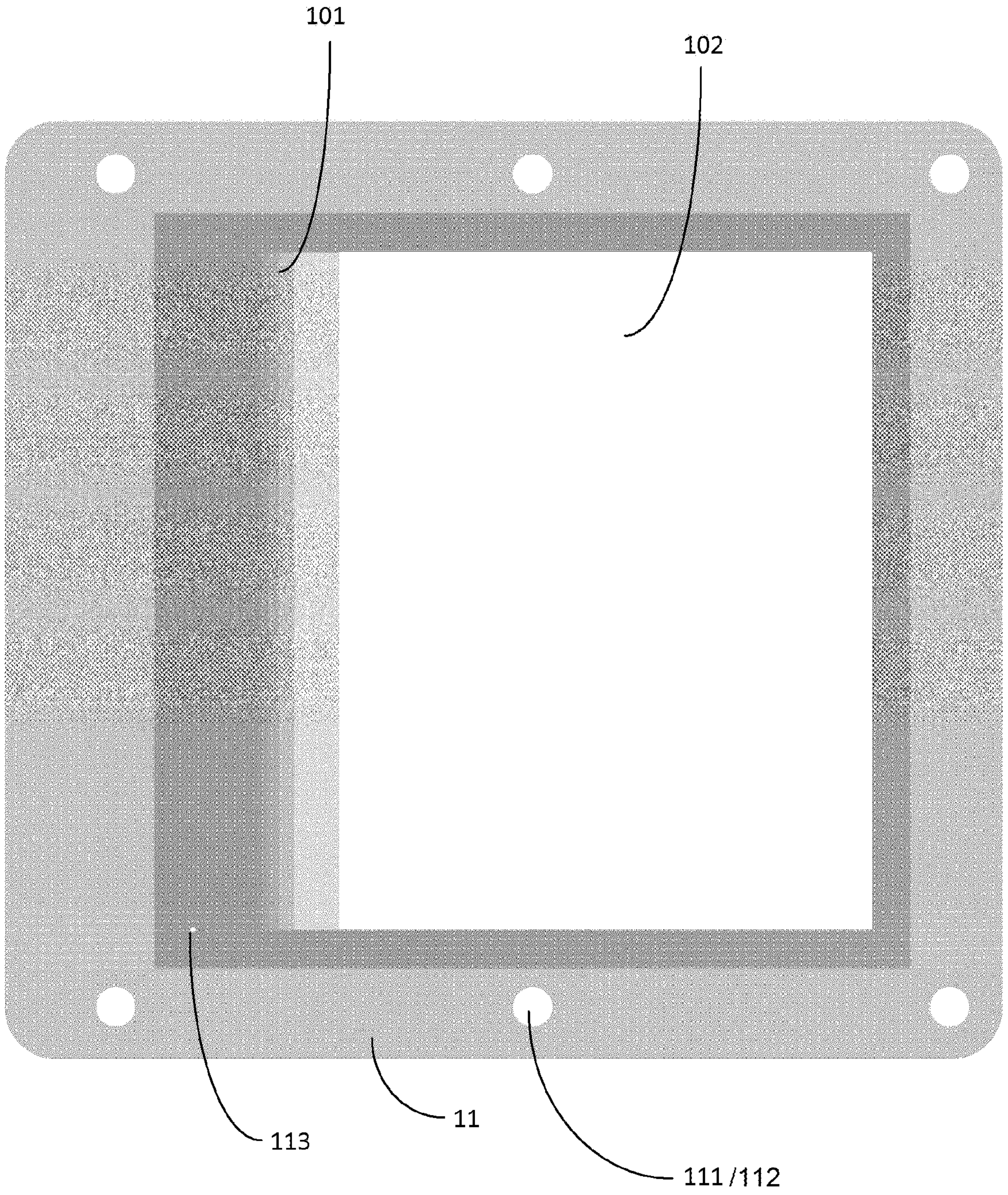
FIG. 7 shows an assembled filter stack according to an embodiment of the present disclosure and the manufacturing process.

FIG. 7 shows an assembled filter stack 1 according to the present disclosure with a stair-step profile, that is, with no gaps 102 between regions of different thickness but instead a gap after the regions of different thickness. This front view on a filter stack 1 shows the six guiding pins 111 of one part of the frame 11 engaged in the six guiding openings 112 in the other part of the frame 11 and the assembled filter foils 10 in between. As can be seen from FIG. 7, the structure of the frame 11 can also be rectangular, i.e., is not limited to a round form and is in particular not limited at all. Moreover, in the lower left corner of the filter stack 1 there is a hole (alignment hole) 113 which is positioned so as to coincide with the axis of the TPS and is intended to be used for alignment of the filter stack 1 assembly to the TPS, preferably using an alignment laser beam. This may be advantageous in cases in which an alignment laser is used to position the TPS in the experiment as the hole in the filter stack may then be used by the alignment laser for aligning the filter stack 1.

Figure 8:
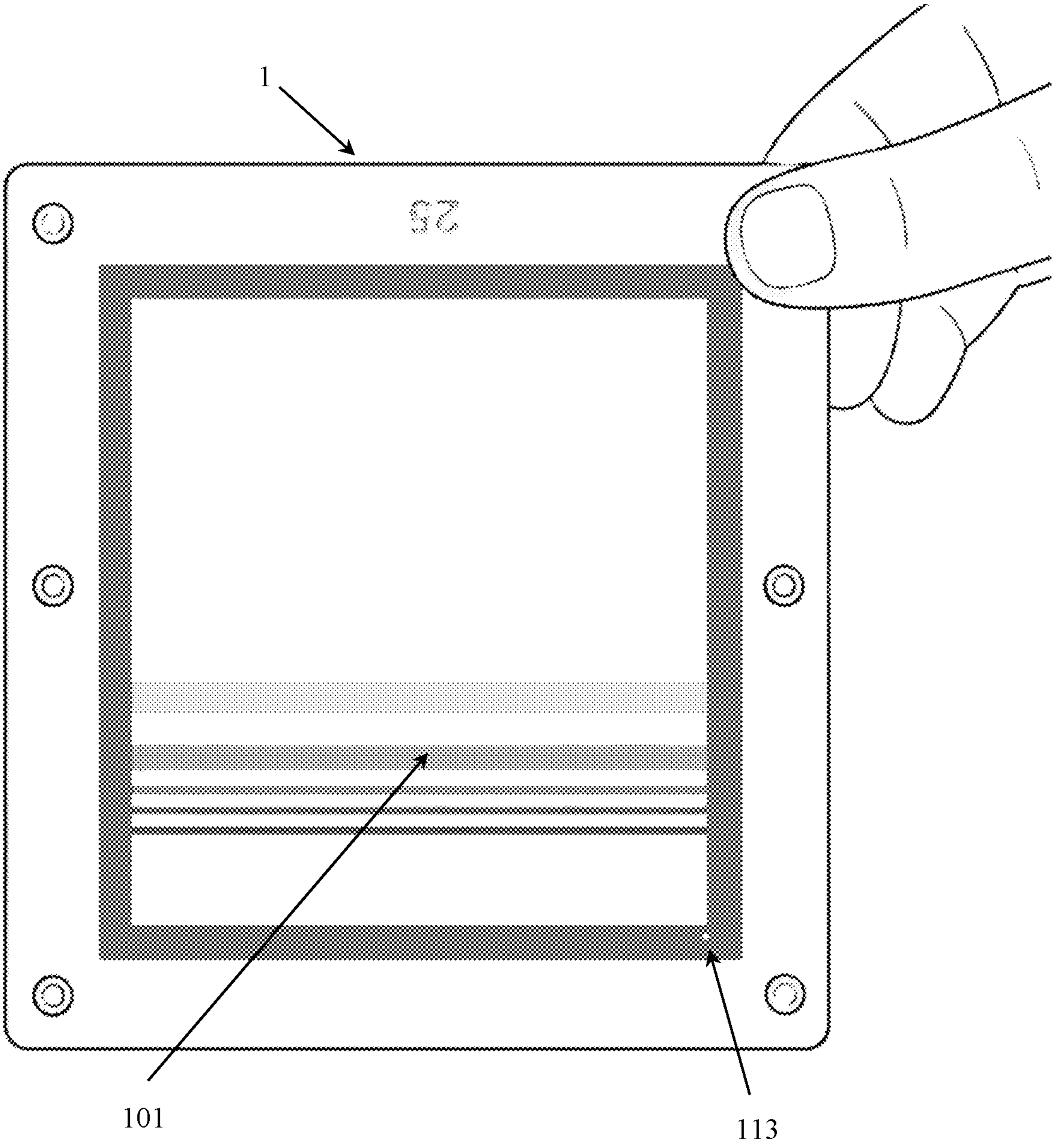
FIG. 8 shows an assembled filter stack according to the present disclosure.

FIG. 8 shows an assembled filter stack 1 according to an embodiment of the present disclosure with a pattern of five parallel stripes 101 and an alignment hole 113 in the bottom right corner of the filter stack 1.

Although detailed embodiments have been described, these only serve to provide a better understanding of the present disclosure and are not to be seen as limiting to the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A filter stack for a Thomson Parabola spectrometer, the filter stack comprising a plurality of filter foils of a filter material, each filter foil shaped to have stripes of a respective stripe size made of the filter material, with gaps of a respective controlled gap size and free of the filter material between the stripes, wherein the plurality of filter foils are assembled into the filter stack in the Thomson Parabola spectrometer such that each particle of a beam of charged particles with equal charge-over-mass ratio analyzed using the filter stack in the Thomson Parabola spectrometer passes through stripes or gaps of a plurality of filter foils.

2. The filter stack according to claim 1, wherein:
the stripes are parallel, or
the stripes are curved and have a constant width, or
the stripes are curved and have a varying width.

3. The filter stack according to claim 1, wherein the gaps are enclosed on at least three sides by the filter material.

4. The filter stack according to claim 1, wherein the stripe sizes and the gap sizes of the filter foil are configured to result in selectively filtering and not filtering at least one type of particle of the beam of charged particles with equal charge-over-mass ratio.

5. The filter stack according to claim 1, wherein the filter stack has a plurality of different filter stack thicknesses that vary in different regions of a plurality of regions of the filter stack in corresponding different regions of the Thomson Parabola spectrometer, each filter stack thickness being equal to a total thickness of filter material in the corresponding region, and wherein the filter thickness of at least one region of the filter stack differs from the filter thickness of at least one other region to adjust attenuation of the particle beam in the different regions.

6. The filter stack according to claim 1, wherein the filter stack further comprises a frame, the frame comprising at least one guiding pin, and each filter foil of the plurality of filter foils is configured to be assembled onto the frame, wherein each filter foil comprises at least one guiding opening for receiving the at least one guiding pin.

7. The filter stack according to claim 5, wherein the filter stack thickness in a region of the filter stack corresponding to a region of the Thomson Parabola spectrometer for filtering neutral particles is different from the filter stack thickness in a region of the filter stack for filtering non-neutral particles.

8. The filter stack according to claim 6, wherein each of the plurality of filter foils comprises at least one guiding opening for receiving the at least one guiding pin.

9. The filter stack according to claim 1, wherein each filter foil is made of a polymer.

10. The filter stack according to claim 9, wherein at least one filter foil is made of a thermoset polymer.

11. The filter stack according to claim 1, wherein the beam comprises at least two types of charged particles with equal charge-over-mass ratio.

12. A filter stack for a Thomson Parabola spectrometer, the filter stack comprising a plurality of filter foils of a filter material, each filter foil shaped to have, across a width of the filter foil, stripes of a respective stripe size made of the filter material, with gaps of a respective controlled gap size free of the filter material between the stripes, wherein the plurality of filter foils are assembled into the filter stack in the Thomson Parabola spectrometer such that the width of each filter foil and a width of the filter stack is orthogonal to the direction of an original beam of charged particles entering the Thomson Parabola spectrometer analyzed using the filter stack in the Thomson Parabola spectrometer, and such that at least a portion of the charged particles of the original beam of charged particles propagates into at least two of the plurality of filter foils.

13. The filter stack according to claim 12, wherein:
the stripes are parallel, or
the stripes are curved and have a constant width, or
the stripes are curved and have a varying width.

14. The filter stack according to claim 12, wherein the gaps are enclosed on at least three sides by the filter material.

15. The filter stack according to claim 12, wherein the stripe sizes and the gap sizes of the filter foil are configured to result in selectively filtering and not filtering at least one type of particle of the beam of charged particles.

16. The filter stack according to claim 12, wherein the wherein the filter stack has a plurality of different filter stack thicknesses that vary in different regions of a plurality of regions of the filter stack, each filter stack thickness being equal to a total thickness of filter material in the corresponding region, and wherein the filter thickness of at least one region of the filter stack differs from the filter thickness of at least one other region to adjust attenuation of the particle beam in the different regions.

17. The filter stack according to claim 16, wherein the filter stack thickness in a region of the filter stack for filtering neutral particles is different from the filter stack thickness in a region of the filter stack for filtering non-neutral particles.

18. The filter stack according to claim 12, wherein the filter stack further comprises a frame, the frame comprising at least one guiding pin, and each filter foil of the plurality of filter foils is configured to be assembled onto the frame, wherein each filter foil comprises at least one guiding opening for receiving the at least one guiding pin.

19. The filter stack according to claim 18, wherein each of the plurality of filter foils comprises at least one guiding opening for receiving the at least one guiding pin.

20. The filter stack according to claim 12, wherein each filter foil is made of a polymer.

21. The filter stack according to claim 20, wherein at least one filter foil is made of a thermoset polymer.

22. The filter stack according to claim 12, wherein the beam comprises at least two types of charged particles with equal charge-over-mass ratio.

23. A filter stack for a Thomson Parabola spectrometer, the filter stack comprising a plurality of filter foils of a filter material, each filter foil shaped to have, across the filter foil, stripes of a respective stripe size made of the filter material, with gaps of a respective controlled gap size free of the filter material between the stripes, such that the filter stack when in the Thomson Parabola spectrometer exhibits a stopping range for charged particles in a beam of charged particles that varies at different points across the filter stack due to the combined stripes and gaps of each filter foil in the plurality of filter foils that any charged particle encounters at each point.

24. The filter stack according to claim 23, wherein:
the stripes are parallel, or
the stripes are curved and have a constant width, or
the stripes are curved and have a varying width.

25. The filter stack according to claim 23, wherein the gaps are enclosed on at least three sides by the filter material.

26. The filter stack according to claim 23, wherein the stripe sizes and the gap sizes of the filter foil are configured to result in selectively filtering and not filtering at least one type of particle of the beam of charged particles.

27. The filter stack according to claim 23, wherein the wherein the filter stack has a plurality of different filter stack thicknesses that vary in different regions of a plurality of regions of the filter stack, each filter stack thickness being equal to a total thickness of filter material in the corresponding region, and wherein the filter thickness of at least one region of the filter stack differs from the filter thickness of at least one other region to adjust attenuation of the particle beam in the different regions.

28. The filter stack according to claim 27, wherein the filter stack thickness in a region of the filter stack for filtering neutral particles is different from the filter stack thickness in a region of the filter stack for filtering non-neutral particles.

29. The filter stack according to claim 23, wherein the filter stack further comprises a frame, the frame comprising at least one guiding pin, and each filter foil of the plurality of filter foils is configured to be assembled onto the frame, wherein each filter foil comprises at least one guiding opening for receiving the at least one guiding pin.

30. The filter stack according to claim 29, wherein each of the plurality of filter foils comprises at least one guiding opening for receiving the at least one guiding pin.

31. The filter stack according to claim 23, wherein each filter foil is made of a polymer.

32. The filter stack according to claim 31, wherein at least one filter foil is made of a thermoset polymer.

33. The filter stack according to claim 23, wherein the beam comprises at least two types of charged particles with equal charge-over-mass ratio.

* * * * *